(12) United States Patent
Lehmann et al.

(10) Patent No.: US 7,537,827 B1
(45) Date of Patent: May 26, 2009

(54) PREPREG LAMINATES

(75) Inventors: Stanley L. Lehmann, Martinez, CA (US); Wei Helen Li, San Ramon, CA (US); Raymond S. Wong, San Ramon, CA (US)

(73) Assignee: Henkel Corporation, Rocky Hill, CT (US)

( * ) Notice: Subject to any disclaimer, the term of this patent is extended or adjusted under 35 U.S.C. 154(b) by 338 days.

(21) Appl. No.: 11/609,975

(22) Filed: Dec. 13, 2006

(51) Int. Cl.
  *B32B 25/02* (2006.01)
(52) U.S. Cl. ............... 428/297.1; 428/292.1; 264/258
(58) Field of Classification Search ............ 428/292.1, 428/297.1; 264/258
  See application file for complete search history.

(56) References Cited

U.S. PATENT DOCUMENTS

| | | | | |
|---|---|---|---|---|
| 3,442,974 | A | 5/1969 | Bremmer | 260/831 |
| 4,419,496 | A | 12/1983 | Henton et al. | 525/301 |
| 4,423,201 | A | 12/1983 | Hicks | 528/76 |
| 4,607,091 | A | 8/1986 | Schreiber | 528/96 |
| 4,778,851 | A | 10/1988 | Henton et al. | 525/65 |
| 4,806,267 | A | 2/1989 | Culbertson et al. | 252/182.23 |
| 5,021,484 | A | 6/1991 | Schreiber et al. | 524/100 |
| 5,139,405 | A * | 8/1992 | Krone et al. | 425/116 |
| 5,200,452 | A | 4/1993 | Schreiber | 524/398 |
| 5,278,257 | A * | 1/1994 | Mulhaupt et al. | 525/454 |
| 5,281,388 | A | 1/1994 | Palmer et al. | 264/571 |
| 5,315,462 | A | 5/1994 | Ohkubo et al. | 360/96.5 |
| 5,369,192 | A | 11/1994 | Ko et al. | 525/484 |
| 5,439,635 | A | 8/1995 | Seemann | 264/510 |
| 5,443,911 | A | 8/1995 | Schreiber et al. | 428/413 |
| 5,445,911 | A | 8/1995 | Russell et al. | 430/115 |
| 5,480,603 | A | 1/1996 | Lopez et al. | 264/131 |
| 5,543,516 | A | 8/1996 | Ishida | 544/69 |
| 5,543,526 | A * | 8/1996 | Mallart et al. | 548/110 |
| 5,567,499 | A | 10/1996 | Cundiff et al. | 428/116 |
| 5,677,048 | A | 10/1997 | Pushaw | 428/320.2 |
| 5,851,336 | A | 12/1998 | Cundiff et al. | 156/272.2 |
| 5,902,535 | A | 5/1999 | Burgess et al. | 264/257 |
| 5,955,566 | A | 9/1999 | Lee et al. | 528/310 |
| 5,981,659 | A | 11/1999 | Geck et al. | 525/100 |
| 6,111,015 | A | 8/2000 | Eldin et al. | 525/65 |
| 6,147,142 | A | 11/2000 | Geck et al. | 523/231 |
| 6,180,693 | B1 | 1/2001 | Tang et al. | 523/231 |
| 6,197,410 | B1 * | 3/2001 | Vallittu et al. | 428/292.1 |

(Continued)

FOREIGN PATENT DOCUMENTS

EP 0 197 892 B2 10/1989

(Continued)

OTHER PUBLICATIONS

S. Rumdusit and H. Ishida, "Development of New Class of Electronic Packaging Materials Based Ternary System of Benzoxazine, Epoxy, and Phenolic Resin", Polymer, 41, 7941-49 (2000).

(Continued)

*Primary Examiner*—N. Edwards
(74) *Attorney, Agent, or Firm*—Steven C. Bauman (57) ABSTRACT

The present invention relates to a prepreg laminate, constructed from a first prepreg; a second prepreg; and a thermoplastic layer therebetween. In the inventive laminate, at least one of the first prepreg or the second prepreg is made from a matrix resin comprising a benzoxazine-containing composition.

20 Claims, 2 Drawing Sheets

U.S. PATENT DOCUMENTS

| | | | |
|---|---|---|---|
| 6,207,786 B1 | 3/2001 | Ishida et al. | 528/94 |
| 6,225,440 B1 * | 5/2001 | Ishida | 528/403 |
| 6,313,248 B1 | 11/2001 | Boyd et al. | 526/262 |
| 6,323,270 B1 | 11/2001 | Ishida et al. | 524/445 |
| 6,429,157 B1 | 8/2002 | Kishi et al. | |
| 6,515,081 B2 * | 2/2003 | Oosedo et al. | 525/531 |
| 6,534,179 B2 | 3/2003 | Japp et al. | 428/413 |
| 6,620,905 B1 | 9/2003 | Musa | 528/423 |
| 6,620,925 B1 | 9/2003 | Noteborn | 536/235 |
| 6,743,852 B2 | 6/2004 | Dershem et al. | 524/548 |
| 6,860,957 B2 * | 3/2005 | Sana et al. | 156/245 |
| 7,045,198 B2 * | 5/2006 | Nakagiri et al. | 428/209 |
| 7,053,138 B2 | 5/2006 | Magendie et al. | 523/451 |
| 7,056,585 B2 * | 6/2006 | Mishima et al. | 428/413 |
| 7,090,920 B2 * | 8/2006 | Davis et al. | 428/413 |
| 7,138,345 B2 | 11/2006 | Wadahara et al. | |
| 7,157,509 B2 * | 1/2007 | Li et al. | 524/87 |
| 7,452,585 B1 * | 11/2008 | Wong et al. | 428/117 |
| 2003/0018131 A1 | 1/2003 | Davis et al. | 525/107 |
| 2005/0032935 A1 | 2/2005 | Salvin et al. | 522/110 |
| 2005/0032946 A1 | 2/2005 | Salvin et al. | 524/186 |
| 2005/0070634 A1 | 3/2005 | Lutz et al. | 525/111 |
| 2006/0035548 A1 | 2/2006 | Goto | 442/181 |

FOREIGN PATENT DOCUMENTS

| | | |
|---|---|---|
| JP | 2003313435 A * | 11/2003 |
| JP | 2006/233188 | 9/2006 |
| WO | WO 2004/108825 A1 | 12/2004 |
| WO | WO 2006/035021 A1 | 4/2006 |
| WO | WO 2006/103185 A1 | 10/2006 |

OTHER PUBLICATIONS

Y. Cui, eta l., "Synthesis and Characterization of Polyurethane/Polybenzoxazine-Based Interpenetral Polymer Networks (IPNs)", School of Chemistry and Chemical Technology, Polymer International, 1246-1248 (2003).

T. Takeichi, et al., "Synthesis and Characterization of Poly(urethane-benzoxazine) Films as Novel Ty of Polyurethane/Phenotic Resin Composites",School of Material Science, Toyohashi University Technology, 4165-4176 (2000).

Burke et al., A New Aminoalkylation Reaction. Condensation of Phenols with Dihydro-1,3-aroxazines J. Org. Chem., vol. 30, pp. 3423-3427 (1965).

* cited by examiner

PREPREG LAMINATES

BACKGROUND OF THE INVENTION

1. Field of the Invention

The present invention relates to a prepreg laminate, constructed from a first prepreg; a second prepreg; and a thermoplastic layer therebetween. In the inventive laminate, at least one of the first prepreg or the second prepreg is made from a matrix resin comprising a benzoxazine-containing composition.

2. Brief Description of Related Technology

Prepregs and prepreg laminates are known. Conventionally, prepregs are prepared from a matrix resin that is based on one or more epoxy resins.

Epoxy resins have been toughened in the past to provide them with more robust performance properties. For instance, mixtures of epoxy resins and phenol-capped polyurethanes are known. Polyurethanes are obtained ordinarily by reacting isocyanates with hydroxy-containing compounds; the resulting polyurethane produces should no longer contain free, phenolic hydroxyl groups. Such polyurethane products may be combined with epoxy resins and amine curing agents to give curable coating agents reportedly distinguished by improved elasticity. See e.g. U.S. Pat. No. 4,423,201 and U.S. Pat. No. 3,442,974.

Epoxy resins can also be mixed with copolymers based on butadiene and acrylonitrile to enhance the impact strength and/or the flexibility of the cured product. However, such copolymers ordinarily compromise the tensile shear strength and the glass transition temperature of the resulting cured products.

U.S. Pat. No. 5,278,257 (Malhaupt) refers to and claims a composition containing a copolymer based on at least one 1,3-diene and at least one polar, ethylenically unsaturated comonomer, a phenol-terminated polyurethane, polyurea or polyurea-urethane of a certain formula, after the removal of the terminal isocyanate, amino or hydroxyl groups, which is soluble or dispersible in epoxy resins, it being necessary for at least one of these groups to be a tertiary amine and where the ratio by weight of the comonomer to the polyurethane, polyurea or polyurea-urethane is from 5:1 to 1:5, and an epoxy resin having at least two 1,2-epoxide groups per molecule.

U.S. Patent Application Publication No. 2005/0070634 describes a composition comprising a) one or more epoxy resins; b) one or more rubber modified epoxy resins; c) one or more toughening compositions comprising the reaction product of one or more isocyanate terminated prepolymers and one or more capping compounds having one or more bisphenolic, phenolic, benzyl alcohol, aminophenyl or, benzylamino moieties where the reaction product is terminated with the capping compound; d) one or more curing agents and one or more catalysts for epoxy resins which initiates cure at a temperature of about 100° C. or greater; and e) optionally, fillers, adhesion promoters, wetting agents and rheological additives useful in epoxy adhesive compositions. The resulting adhesive composition is reported to have a viscosity at 45° C. of about 20 Pa.s to about 400 Pa.s.

Epoxy resins blended with benzoxazines are also known. See e.g. U.S. Pat. No. 4,607,091 (Schreiber), U.S. Pat. No. 5,021,484 (Schreiber), U.S. Pat. No. 5,200,452 (Schreiber), and U.S. Pat. No. 5,445,911 (Schreiber). These reported compositions appear to be potentially useful commercially, as the epoxy resins can reduce the melt viscosity of benzoxazines allowing for the use of higher filler loading while maintaining a processable viscosity. However, epoxy resins oftentimes undesirably increase the temperature at which benzoxazines polymerize.

Compositions of epoxy resins, benzoxazine and phenolic resins are known as well. See U.S. Pat. No. 6,207,786 (Ishida), and S. Rimdusit and H. Ishida, "Development of new class of electronic packaging materials based on ternary system of benzoxazine, epoxy, and phenolic resin", Polymer, 41, 7941-49 (2000).

Compositions of benzoxazines and curable materials other than epoxy and/or phenolics are also known. To that end, U.S. Pat. No. 6,620,925 (Musa) is directed to and claims a curable composition comprising certain benzoxazine compounds without reactive functionality other than the benzoxazine (apart from allyl and propargyl which are disclosed but not claimed) and a curable compound or resin selected from vinyl ethers, vinyl silanes, compounds or resins containing vinyl or allyl functionality, thiolenes, compounds or resins containing cinnamyl or styrenic functionality, fumarates, maleates, acrylates, maleimides, cyanate esters, and hybrid resins containing contain both vinyl silane and cinnamyl, styrenic, acrylate or maleimide functionality.

In addition, U.S. Pat. No. 6,743,852 (Dershem) discloses combinations of liquid benzoxazines and a thermosetting resin composition for adhering materials with dissimilar coefficients of thermal expansion comprising a) a benzoxazine compound in liquid form, b) thermoset compounds including epoxy, cyanate ester, maleimide, acrylate, methacrylate, vinyl ether, styrenic, vinyl ester, propargyl ether, diallyl amide, aromatic acetylene, benzocyclobutene, thiolenes, maleate, oxazoline, and itaconate, c) optionally, one or more anti-oxidants, bleed control agents, fillers, diluents, coupling agents, adhesion promoters, flexibilizers, dyes and pigments, and d) a cure initiator.

Y. Cui, et al. have reported on the synthesis and characterization of polyurethane/polybenzoxazine-based interpenetrating polymer networks. See Y. Cui, et al., "Synthesis and Characterization of Polyurethane/Polybenzoxazine-Based Interpenetrating Polymer Networks (IPNs)", School of Chemistry and Chemical Technology, Polymer International, 52:1246-1248 (2003).

T. Takeichi, et al. have reported on the synthesis and characterization of poly(urethane-benzoxazine) films as novel type of polyurethane/phenolic resin composites. See T. Takeichi, et al., "Synthesis and Characterization of Poly(urethane-benzoxazine) Films as Novel Type of Polyurethane/Phenolic Resin Composites", School of Material Science, Toyohashi University of Technology, 4165-4176 (2000).

To date however it is not believed that prepreg laminates prepared with an interlayer of a thermoplastic material between at least two prepregs have been reported, particularly where at least one of the prepregs is prepared from a matrix resin formulated from benzoxazines.

SUMMARY OF THE INVENTION

The present invention relates to a prepreg laminate constructed from a first prepreg; a second prepreg; and a thermoplastic layer therebetween. In the inventive laminate, at least one of the first prepreg or the second prepreg is made from a matrix resin comprising a benzoxazine-containing composition.

The benzoxazine-containing composition may be toughened and in that regard includes a benzoxazine component, a toughener component, and optionally, an epoxy resin component.

BRIEF DESCRIPTION OF THE FIGURES

FIG. 2 depicts a synthetic scheme by which an adduct of hydroxy-containing compounds, isocyanate-containing compounds and phenolic compounds ("first adduct") and an adduct of the first adduct, epoxy-containing compounds and phenolic compounds ("second adduct"), which may be used as a toughener in the benzoxazine-containing composition may be prepared. In FIG. 2, the term "polyol" refers to the polybutyleneoxide diol shown as the first reactant in portion A; the term "PU" refers to polyurethane linkage(s); the term "EP" refers to diglycidyl ether of bisphenol A, or epoxidized phenol; and the term "BPA" refers to bisphenol A shown as the second reactant in portion E.

DETAILED DESCRIPTION OF THE INVENTION

As noted above, the present invention relates to a prepreg laminate constructed from a first prepreg; a second prepreg; and a thermoplastic layer therebetween. In the inventive laminate, at least one of the first prepreg or the second prepreg is made from a matrix resin comprising a benzoxazine-containing composition.

Figure 1:
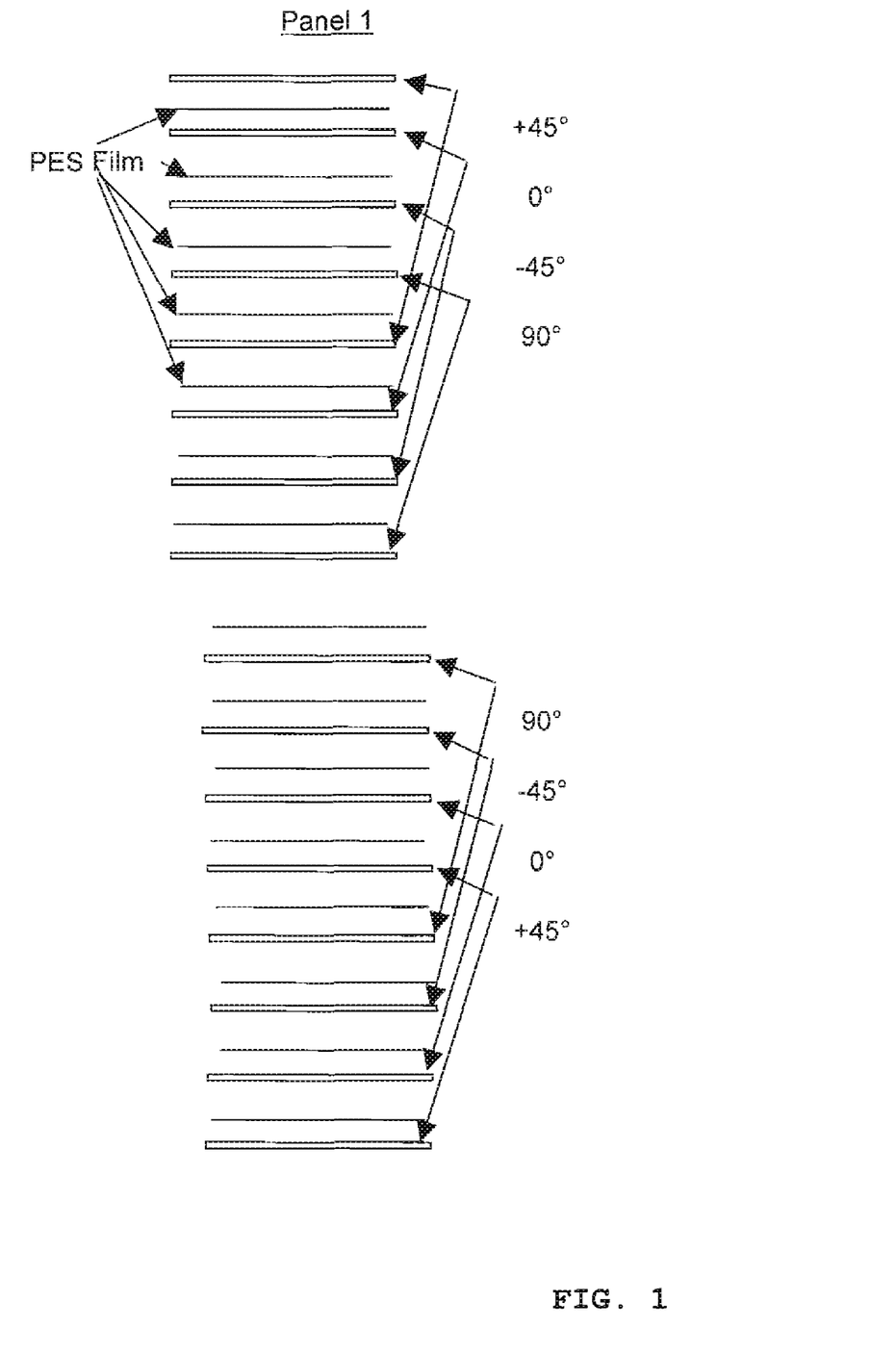
FIG. 1 depicts a cross sectional, exploded view of a prepreg laminate made in accordance with the present invention.

Reference to FIG. 1 shows in cross sectional view the construction of the prepreg laminate 10. A first prepreg 12 and a second prepreg 14 are arranged with a thermoplastic layer therebetween 16. During the thermal cure process (by exposure to elevated temperature conditions), the thermoplastic layer softens and may melt into discrete or partially discrete domains between the two prepregs. These domains are thought to provide enhanced toughness to the resulting prepreg laminate so formed. The material chosen for the thermoplastic layer should be chosen so that it has a melting or softening temperature in the range of the cure temperature. In addition, the material chosen for the thermoplastic layer should have some degree of solubility in the matrix resin. Desirably, the thermoplastic film is soluble in the matrix resin at a temperature below the cure temperature of the matrix resin. In this way, during processing of the laminate for cure, the laminate will be ramp heated to and held at a temperature that allows the thermoplastic layer to dissolve in the matrix resin, and then heated at an increased temperature, which crosslinks the laminate. The dissolved thermoplastic phase separates during the crosslinking cure step to form a morphology that enhances the toughness of the laminate. The material chosen for the thermoplastic layer should also be selected for high Tg so that its addition to the matrix resin does not result in large laminate Tg decrease.

At least one, though in many instances two, of the prepregs are made from a matrix resin formulated from benzoxazine-containing compositions. The components of these compositions are discussed below.

Matrix Resin

Benzoxazines

The benzoxazine may be embraced by the following structure:

I where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from hydrogen, alkyl, alkenyl and aryl, and $R_4$ is selected from hydrogen, halogen, alkyl and alkenyl.

More specifically, within structure I the benzoxazine may be embraced by the following structure:

II where X is selected from a direct bond, $CH_2$, $C(CH_3)_2$, $C=O$, S, $S=O$ and $O=S=O$, $R_1$ and $R_2$ are the same or different and are selected from hydrogen, alkyl, such as methyl, ethyl, propyls and butyls, alkenyl, such as allyl, and aryl and $R_4$ are the same or different and are selected from hydrogen or alkenyl, such as allyl.

Representative benzoxazines within structure II include:

III

IV

V

VI where R₁, R₂ and R₄ are as defined above.

Alternatively, the benzoxazine may be embraced by the following structure:

VII where p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and R₄ is selected from hydrogen, halogen, alkyl and alkenyl.

Though not embraced by structures I or VII additional benzoxazines are within the following structures:

VIII

IX

X where R₁, R₂ and R₄ are as defined above, and R₃ is defined as R₁ R₂ and R₄.

Specific examples of these benzoxazines include:

XI

The benzoxazine component may include the combination of multifunctional benzoxazines and monofunctional benzoxazines, or may be the combination of one or more multifunctional benzoxazines or one or more monofunctional benzoxazines.

Examples of monofunctional benzoxazines may be embraced by the following structure:

where R is alkyl, such as methyl, ethyl, propyls and butyls, or aryl with or without substitution on one, some or all of the available substitutable sites, and $R_4$ is selected from hydrogen, halogen, alkyl and alkenyl.

For instance, monofunctional benzoxazines may be embraced by the structure:

XX where in this case R is selected from alkyl, alkenyl, each of which being optionally substituted or interupted by one or more O, N, S, C=O, COO, and NHC=O, and aryl; m is 0-4; and $R_1$-$R_5$ independently selected from hydrogen, alkyl, alkenyl, each of which being optionally substituted or interupted by one or more O, N, S, C=O, COOH, and NHC=O, and aryl.

More specific examples of such a monofunctional benzoxazine are:

XXI where R is as defined above; or

XXII

Some benzoxazines are presently available commercially from several sources, including Huntsman Advanced Materials; Georgia-Pacific Resins, Inc.: and Shikoku Chemical Corporation, Chiba, Japan, the last of which offers among other B-a, B-m, F-a, C-a, Pd and F-a benzoxazine resins.

If desired, however, instead of using commercially available sources, the benzoxazine may typically be prepared by reacting a phenolic compound, such as a bisphenol A, bisphenol F, bisphenol S or thiodiphenol, with an aldehyde and an alkyl or aryl amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See also Burke et al., *J. Org. Chem.*, 30(10), 3423 (1965); see generally U.S. Pat. No. 4,607,091 (Schreiber), U.S. Pat. No. 5,021,484 (Schreiber), U.S. Pat. No. 5,200,452 (Schreiber) and U.S. Pat. No. 5,443,911 (Schreiber).

The benzoxazine should be present in the inventive composition in an amount in the range of about 10 to about 90 percent by weight, such as about 25 to about 75 percent by weight, desirably about 35 to about 65 percent by weight, based on the total weight of the composition.

Benzoxazine polymerization can be self-initiated under elevated temperature conditions and also by inclusion of cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; and oxyhalides. Likewise, basic materials, such as imidizaoles, may be used to initiate polymerization.

Tougheners

A variety of tougheners may be used in the matrix resin, when it is desired to toughen the resin. While optional, illustrative tougheners when used include copolymers based on butadiene/acrylonitrile, butadiene/(meth)acrylic acid esters, butadiene/acrylonitrile/styrene graft copolymers ("ABS"), especially ABS powders, and butadiene/methyl methacrylate/styrene graft copolymers ("MBS").

Additional tougheners include poly(propylene) oxides; amine-terminated polyethylene sulfides, such as PES 5003P, available commercially from Sumitomo Chemical Company, Japan; core shell polymers, such as PS 1700, available commercially from Union Carbide Corporation, Danbury, Conn.; and BLENDEX 338, SILTEM STM 1500 and ULTEM 2000, which are available commercially from General Electric Company. ULTEM 2000 (CAS Reg. No. 61128-46-9) is a polyetherimide having a molecular weight ("Mw") of about 30,000±10,000.

Other tougheners include a rubber modified epoxy resin, for instance an epoxy-terminated adduct of an epoxy resin and a diene rubber or a conjugated diene/nitrile rubber. This epoxy-terminated adduct is suitably prepared in the reaction of a polyepoxide, a compound having an average of more than one epoxy group as described hereinbefore, with a carboxy-functional conjugated diene rubber or a conjugated diene/nitrile rubber. The diene rubber is a polymer of a conjugated diene monomer such as butadiene and isoprene. Butadiene rubbers are preferred. Conjugated diene/nitrile rubbers are copolymers of a conjugated diene and an ethylenically unsaturated nitrile monomer, of which acrylonitrile is desirable. When a conjugated diene/nitrile rubber is used, at least one such rubber present in the composition contains less than about 30 weight percent polymerized unsaturated nitrile, and preferably no more than about 26 weight percent polymerized unsaturated nitrile. The rubber also contains terminal groups that will react with an epoxide to form a covalent bond thereto. Preferably, the rubber contains from about 1.5, more preferably from about 1.8, to about 2.5, more preferably to about 2.2, of such terminal groups per molecule, on average. Carboxyl-terminated rubbers are preferred. The rubber is preferably a liquid at room temperature, and preferably has a glass transition temperature of less than about −25° C., preferably from about −30 to about −90° C. The Mw of the rubber is suitably from about 2,000 to about 6,000, more preferably from about 3,000 to about 5,000. Suitable carboxyl-functional butadiene and butadiene/acrylonitrile rubbers are commercially available from Noveon under the HYCAR tradename, such as HYCAR 2000X162 carboxyl-terminated butadiene homopolymer and HYCAR 1300X31 carboxyl-terminated butadiene/acrylonitrile copolymer. A suitable amine-terminated butadiene/acrylonitrile copolymer is sold under the tradename HYCAR 300X21. Other examples of nitrile rubbers include HYCAR 1300X8, HYCAR 1300X13, HYCAR 1300X9, HYCAR 1300X18 and HYCAR 1300X31 carboxyl-terminated butadiene acrylonitrile copolymers, all commercially available from Noveon.

The conjugated diene or conjugated diene/nitrile rubber is formed into an epoxy-terminated adduct by reaction with an excess of a polyepoxide. A wide variety of polyepoxide compounds such as cycloaliphatic epoxides, epoxidized novolac resins, epoxidized bisphenol A or bisphenol F resins, butanediol polyglycidyl ether, neopentyl glycol polyglycidyl ether or flexible epoxy resins can be used, but generally preferred on the basis of cost and availability are liquid or solid glycidyl ethers of a bisphenol such as bisphenol A or bisphenol F. Halogenated, particularly brominated, resins can be used to impart flame retardant properties if desired. For forming the adduct, liquid epoxy resins (such as bisphenol A epoxy resins, DER 331, available from The Dow Chemical Company) are especially preferred for ease of handling if making the adduct. Typically, the rubber and an excess of the polyepoxide are mixed together with a polymerization catalyst such as a substituted urea or phosphine catalyst, and heated to a temperature of about 100 to about 250° C. in order to form the adduct. Preferred catalysts include henyl dimethyl urea and triphenyl phosphine. Preferably, enough of the polyepoxide compound is used that the resulting product is a mixture of the adduct and free polyepoxide compounds.

Rubber particles having a core-shell structure are another example of useful tougheners or impact modifiers. Such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane). The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently). The shell may be grafted onto the core. The polymer comprising the shell may bear one or more different types of functional groups (e.g., epoxy groups) that are capable of interacting with other components of the curable adhesives of the present invention.

Typically, the core will comprise from about 50 to about 95 percent by weight of the rubber particles while the shell will comprise from about 5 to about 50 percent by weight of the rubber particles.

Preferably, the rubber particles are relatively small in size. For example, the average particle size may be from about 0.03 to about 2 microns or from about 0.05 to about 1 micron. In certain embodiments of the invention, the rubber particles have an average diameter of less than about 500 nm. In other embodiments, the average particle size is less than about 200 nm. For example, the core-shell rubber particles may have an average diameter within the range of from about 25 to about 200 nm.

Methods of preparing rubber particles having a core-shell structure are well-known in the art and are described, for example, in U.S. Pat. Nos. 4,419,496, 4,778,851, 5,981,659, 6,111,015, 6,147,142 and U.S. Pat. No. 6,180,693, each of which being hereby expressly incorporated herein by reference in its entirety.

Rubber particles having a core-shell structure may be prepared as a masterbatch where the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in International Patent Publication No. WO 2004/108825, hereby expressly incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch.

A particularly suitable dispersion of rubber particles having a core-shell structure in an epoxy resin matrix is available from Kaneka Corporation under the product names MX-120 and MX-156. Other commercially available masterbatches of core-shell rubber particles dispersed in epoxy resins include GENIOPEARL M23A (a dispersion of 30 weight % core-shell particles in an aromatic epoxy resin based on bisphenol A diglycidyl ether; the core-shell particles have an average diameter of about 100 nm and contain a crosslinked silicone elastomer core onto which an epoxy-functional acrylate copolymer has been grafted); the silicone elastomer core represents about 65 weight percent of the core-shell particle), available from Wacker Chemie GmbH.

In addition, an adduct combination as discussed below may be used.

Adducts

First Adduct

Figure 2:
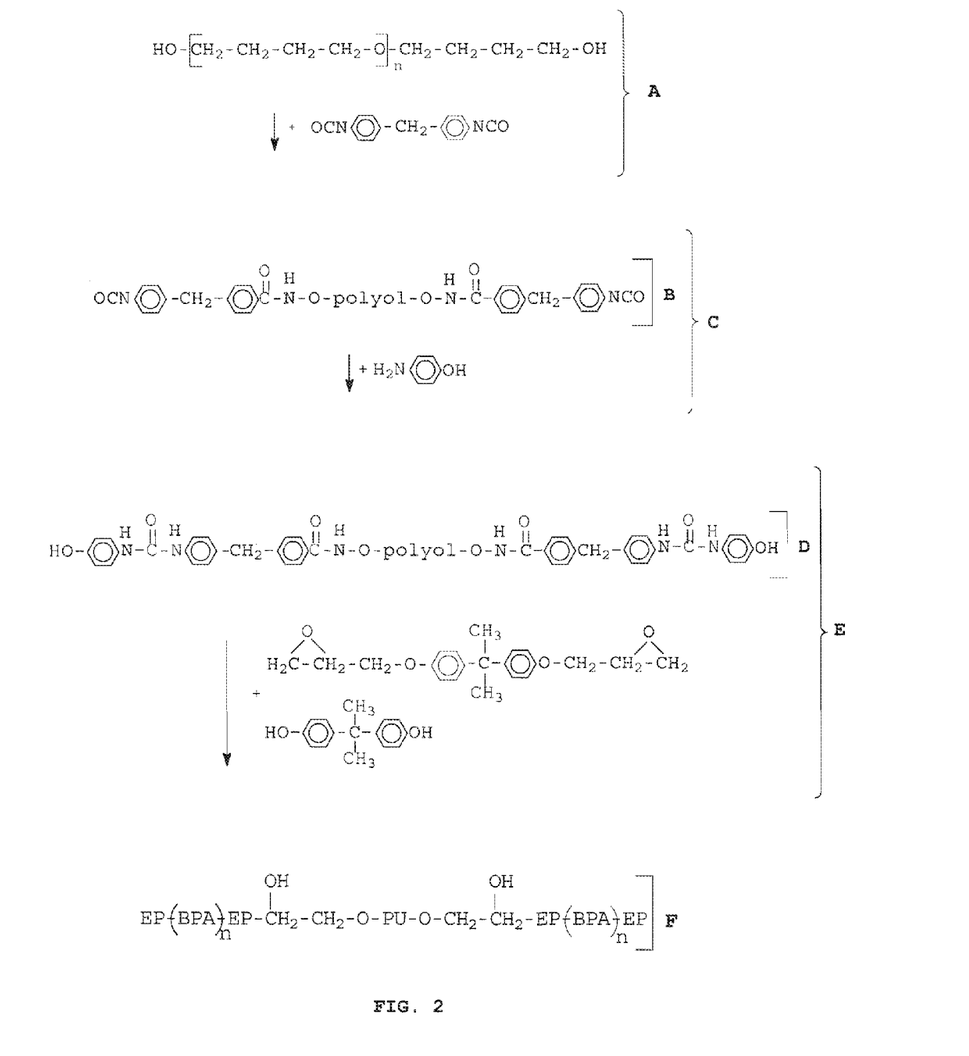

Reference to FIG. 2 may be helpful in understanding how the first adduct useful herein may be prepared.

The first adduct as noted is prepared from hydroxy-containing compounds, isocyanate-containing compounds and phenolic compounds. Portion A in FIG. 1 shows the reaction of a hydroxy-containing compound with an isocyanate-containing compound to yield a polyurethane with isocyanate terminal groups, shown as portion B. The polyurethane with isocyanate terminal groups is then reacted with a phenolic compound, here the hydroxyl amine p-amino phenol, to yield the first adduct, a hydroxy terminated polyurethane prepolymer, shown as portion D. This reaction is shown as portion C in FIG. 2.

For these reactants, the hydroxy-containing compound, such as a hydroxy terminated polyalkylene ether, may be reacted with an isocyanate-containing compound, such as a diisocyanate, for a time and amount sufficient to ensure isocyanate capping of the hydroxy terminated polyalkylene ether. Thus, the hydroxy terminated polyalkylene either may be mixed with the diisocyanate and reacted at a temperature in the range of about 50° C. to about 80° C. for a period of about 0.5 to 2.5 hours, desirably under an inert atmosphere, such as a nitrogen blanket, to form an isocyanate-terminated polyurethane prepolymer, with which may be reacted a phenolic compound, such as an hydroxyl amine, resulting in the formation of an hydroxyl-terminated polyurethane prepolymer (see portions C and D in FIG. 2).

Despite that which is shown in FIG. 2, the hydroxy-terminated polyurethane adduct formed as the first adduct can be prepared by alternative routes depending on the nature of the starting reactants.

For instance, and not shown in FIG. 2, the prepolymer can first be reacted with phosgene, and the resulting chlorocarbonyloxy derivative can then be reacted with a hydroxy containing compound, such as phenol or aminophenol.

More broadly speaking, though with general reference to FIG. 2, the hydroxy-containing compound, such as a hydroxylated polyalkylene ether, is reacted with the isocyanate-containing compound, such as a polyisocyanate, optionally in the presence of a catalyst, such as a condensation catalyst suitable for catalyzing the reaction between hydroxyl groups and isocyanate groups. The hydroxy-containing compound and the isocyanate-containing compound are allowed to react until a urethane prepolymer is formed, which terminates with isocyanate groups and substantially polyalkylene ether, no hydroxyl group present from the hydroxylated groups remains.

As noted, this reaction may be performed in the presence of a condensation catalyst. Examples of such catalysts include the stannous salts of carboxylic acids, such as stannous octoate, stannous oleate, stannous acetate, and stannous laureate; dialkyltin dicarboxylates, such as dibutyltin dilaureate and dibutyltin diacetate; tertiary amines an tin mercaptides. When used, the amount of catalyst employed is generally between about 0.00025 and about 5 percent by weight of the catalyzed reactants, depending on the nature of the reactants.

The hydroxy-containing compounds used to make the polyurethane prepolymer should have a molecular weight of 1,500 to 3,000 molecular weight (number average, "Mn"), and the isocyanate-containing compound should have a molecular weight of 150 to 400 Mn for monomeric isocyanate-containing compounds and up to 2,000 Mn for polymeric isocyanate-containing compounds, as measured by gel permeation chromatography ("GPC") using polyethylene glycol standards for calibration purposes.

The first adduct thus should have a molecular weight in the range of 55,000 to 90,000 Mn, such as 65,000 to 75,000 Mn, measured as before with GPC.

The first adduct should desirably have a softening point below 120° C.

The first adduct may be used in an amount of 0.05 to 20, such as 0.5 to 10, percent by weight.

Hydroxy-Containing Compounds

The hydroxy-containing compounds, such as hydroxylated polyalkylene ethers, form a polyurethane prepolymer with the isocyanate-containing compound. The polyalkylene ethers include a series of hydrocarbon groups separated by oxygen atoms and terminated with hydroxyl. The hydrocarbon groups should be alkylene groups—straight or branched chain—and should have from 2 to about 6 carbons, such as about 2 to about 4 carbon atoms, desirably about 3 to about 4 carbon atoms.

The alkylene groups may be thus derived from ethylene oxide, propylene oxides, butylene oxides or tetrahydrofuran. Preferably, the polyether polyols are used to prepare the prepolymer have a functionality of about 2 to about 6, such as about 2 to about 4, desirably from about 2 to about 3. Thus, the hydroxylated polyalkylene ether should have a molecular weight of about 400 to about 8,000 Mn, such as about 1,000 to about 3,000 Mn.

The hydroxy-containing compounds may also be segmented prepolymers containing polyether segments, such as polyether-amides, polyether-urethanes and polyether-ureas. Polyalkylene as used in this context refers to a polyether having repeating units containing straight or branched chain alkylene groups.

Other examples of hydroxy-containing compounds include polyalkylene thioether-polyols, for example the polycondensation products of thiodiglycol with itself and with diols and/or polyols, for example, 1,6-hexanediol, triethylene glycol, 2,2-dimethyl-1,3-propanediol or 1,1,1-trimethylolpropane.

Still other examples include hydroxyl-terminated polybutadienes or polyalkylene oxide diols, such as polypropylene oxide diols like those sold under the tradenames ACCLAIM by Bayer AG and POLYMEG, by Lyondell Chemical Co., Houston, Tex. For example, ACCLAIM 2200 and POLYMEG 2000 are commercially available poly(propylene ether) diols useful in the present invention. In addition, TERATHANE 2000, which is a poly(butylene ether) diol, is also particularly useful herein.

The hydroxy-containing compounds may conform to structure XXIII:

XXIII where $R^5$ is H, $R^6$ is CH, $R^7$ is H, n is 2-6, such as 3-4 and x is 12-45, such as 20-35.

In addition, amino-terminated polyalkylene ethers may be used instead of or in connection with hydroxyl-terminated polyalkylene ethers and they may be embraced by structure XXIV:

XXIV where $R_5$, $R^6$, $R^7$, n and x are defined, and $R^8$ is alkylene as in structure XXIII.

In addition, the hydroxy-containing compounds may be hydroxy-terminated polyesters.

Hydroxy-terminated polyesters include a wide variety of materials including polyalkylene glycol esters such as polyethylene and polypropylene glycol esters.

Among the useful polyester diols are polyaliphatic and polyaromatic esters. Among the more desirable esters are the aromatic esters such as those conforming to structure XXV

XXV where $R^9$ is a poly(alkylene) or poly(arylene) radical and n is 1-100.

Polyaromatic esters such as those having structure XXIV are also useful:

XXIV where $R^{10}$ is $C_{2-10}$ polyalkylene oxide, and desirably di-, tir- or tetra-methylene oxide.

While the hydroxy-containing compounds have been discussed under this heading, alternatives for use herein include amino and thiol versions thereof. And of course combinations of such compounds may be used herein.

The hydroxy-containing compound should be used in a percent by weight ratio to isocyanate-containing compound in a range of 1:10 to 1:2, such as 1:8 to 1:4, for instance 1:6.

Isocyanate-Containing Compounds

The isocyanate-containing compounds used to prepare the isocyanate-terminated polyurethane should be a polyisocyanate, such as a diisocyanate (for instance an aliphatic, cycloaliphatic, aromatic or aralphatic one) or triisocyanate, which is reactive with the hydroxyl-containing compound, as described above or, if desirable, in combination with chain lengtheners (short-chain polyhydroxyl, polysulfhydryl or polyamine compounds), or a polyisocyanate prepolymer derived from a prepolymer polyamine, such as a prepolymer polyetheramine.

A variety of diisocyanates are useful for reaction in this regard and the choice of any particular one will be left to those persons of ordinary skill in the art, likely to be dictated in part by the commercial availability and in part by the end use properties desired.

Useful diisocyanates include ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dedecamethylene diisocyanate, tetradecamethylene diisocyanate, hexadecamethylene diisocyanate, octadecamethylene diisocyanate, eicosamethylene diisocyanate, cyclohexamethylene diisocyanate, cyclopenthalene diisocyanate, or cyclohepthalene diisocyanate, or bis-cyclohexalene, cyclohexylmethylene diisocyanate, tetramethylxylylene diisocyanate, phenyl diisocyanate, toluene diisocyanate (such as, 2,4-diisocyanatotoluene and 2,6-diisocyanatotoluene), 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclohexylmethane diisocyanate, 1,3-bis-(isocyanatomethyl) cyclohexene, cyclohexylene diisocyanate, tetrachlorophenylene diisocyanate, 2,6-diethyl-p-phenylenediisocyanate, 3,5-diethyl-4,4'-diisocyanatodiphenyl-methane, tetramethylene diisocyanate, hexamethylene diisocyanate, ethylene diisocyanate, cyclohexylene diisocyanate, nonamethylene diisocyanate, octadecamethylene diisocyanate, 2-chloropropane diisocyanate, 2,2'-diethylether diisocyanate, 3-(dimethylamine) pentane diisocyanate, tetrachlorophenylene diisocyanate-1,4, 3-heptane diisocyanate and transvinylene diisocyanate.

Additional examples of suitable isocyanates are urethanized 4,4'-diisocyanatodiphenylmethane, carbodiimidized 4,4'-diisocyanatodiphenylmethane, the uretdione of 2,4-diisocyanatotoluene, triisocyanatotriphenylmethane, the adduct formed from diisocyanatotoluene and trimethylolpropane, the trimer formed from diisocyanatotoluene, diisocyanato-m-xylylene, N,N'-di-(4-methyl-3-isocyanatophenyl)-urea, mixed trimerization products of diisocyanatotoluene and 1,6-diisocyanatohexamethylene, 1,6-diisocyanatohexane, 3,5,5-trimethyl-1-isocyano-3-isocyanatomethylcyclohexane (isophorene diisocyanate), N,N',N'''-tri-(6-isocyanatohexyl)-biuret, 2,2,4-trimethyl-1,6-diisocyanatohexane, 1-methyl-2,4-diisocyanatocyclohexane, diisocyanate, 4,4'-diisocyanatodicyclohexylmethane, trimeric isophorene, diisocyanate, trimeric hexane diisocyanate and methyl 2,6-diisocyanatohexanoate.

As noted above, chain lengtheners may be used as well, examples of which include diols and polyols, such as 1,4-butanediol, 1,1,1-trimethylolpropane or hydroquinone 2-hydroxyethyl ether, or diamines, such as diaminoethane, 1,6-diaminohexane, piperazine, 2,5-dimethylpiperazine, 1-amino-3--aminomethyl-3,5,5-trimethylcyclohexane, 4,4'-diaminocyclohexylmethane, 1,4-diaminocyclohexane and 1,2-propylenediamine, or hydrazine, amino acid hydrazides, hydrazides of semicarbazidocarboxylic acids, bis-hydrazides and bis-semicarbazides.

Capping Agent

The capping agent used to react with the isocyanate-terminated group of the isocyanate-terminated polyurethane prepolymer in portion C of FIG. 2 is an hydroxyl amine compound which may be selected from a variety of materials, such as amino phenol, as shown in FIG. 1.

More generally, the capping agent useful is any hydroxyl-containing compound reactive with the isocyanate including functionalized aliphatic alcohols and aromatic alcohols, such as phenol, and which under appropriate reaction conditions reacts with the isocyanate groups of the isocyanate-terminated polyurethane prepolymer.

The capping agent and isocyanate-terminated polyurethane prepolymer may be reacted at an appropriate temperature for a sufficient time to cause reaction between the isocyanate groups and the amino groups on the capping agent. Preferably, this reaction continues for a period of about 20 minutes to about 120 minutes, at a temperature in the range of 50 to 100° C. A catalyst, such as any of the condensation catalyst discussed above, may be used to enhance reaction times in preparing the first adduct.

And of course combinations of such compounds may be used herein.

As all of the isocyanate-containing compound is reacted with the capping agent, an appropriate amount of capping agent is to be used to facilitate such reaction. The precise amount of course will depend on the nature, identity and amount of the remaining reactants that are used to form the first adduct and as such will be left to the discretion of those persons of ordinary skill in the art.

Second Adduct

The adducts of hydroxy end-capped polyurethane compounds, epoxy-containing compounds and phenolic compounds may be prepared from the following components, described below under separate headings.

Again reference to FIG. 2 may be helpful in understanding how the second adduct useful herein may be prepared.

The second adduct may be used in an amount of 0.5 to 10, such as 1 to 5, for instance 2 to 4 weight percent, based on the total amount of the composition.

Hydroxy End-Capped Polyurethane Compounds

The first adduct is as described above, and may be used in an amount of 0.05 to 10, such as 0.1 to 5, for instance 0.25 to 1, percent by weight of the component used to form the second adduct together with the following components.

Epoxy-Containing Compound

Commercially available epoxy-containing compounds for use in preparing the adducts are illustrated below.

The epoxy-containing compounds used to form the adduct with the hydroxy end-capped polyurethane and phenolic compounds may include multifunctional epoxy-containing containing compounds, such as $C_1$-$C_{28}$ alkyl-, poly-phenol glycidyl ethers; polyglycidyl ethers of pyrocatechol, resorcinol, hydroquinone, 4,4'-dihydroxydiphenyl methane (or bisphenol F, such as RE-303-S or RE-404-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexene, 4,4'-dihydroxy-3,3'-dimethyldiphenyl propane, 4,4'-dihydroxydiphenyl sulfone, and tris(4-hydroxyphyenyl)methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

Among the commercially available epoxy-containing compounds suitable for use in the present invention are polyglycidyl derivatives of phenolic compounds, such as those available under the tradenames EPON 825, EPON 826, EPON 828, EPON 1001, EPON 1007 and EPON 1009 or waterborne dispersions under the tradenames EPI-REZ 3510, EPI-REZ 3515, EPI-REZ 3520, EPI-REZ 3522, EPI-REZ 3540 or EPI-REZ 3546 from Hexion; DER 331, DER 332, DER 383, DER354, and DER 542 from The Dow Chemical Company; GY285 from Huntsman, Inc.; and BREN-S from Nippon Kayuku, Japan. Other suitable epoxy-containing compounds include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company and a waterborne dispersion ARALDITE PZ 323 from Huntsman.

Cresol analogs are also available commercially such as ECN 1273, ECN 1280, ECN 1285, and ECN 1299 or waterborne dispersions ARALDITE ECN 1400 from Huntsman. SU-8 and EPI-REZ 5003 are bisphenol A-type epoxy novolacs available from Hexion. Epoxy or phenoxy functional modifiers to improve adhesion, flexibility and toughness, such as the HELOXY brand epoxy modifiers 67, 71, 84, and 505. When used, the epoxy or phenoxy functional modifiers may be used in an amount of about 1:1 to about 5:1 with regard to the heat curable resin.

Of course, combinations of the different epoxy are also desirable for use herein.

The epoxy-containing compounds should be used to form the second adduct in percent by weight ratio with the first adduct and the phenolic compound of 4:3:3 to 7:0.5:2.5, such as 6:1:3. Thus, it is seen that the epoxy-containing compounds are used in a large excess to the other components.

Phenolic Compounds

Phenolic compounds may be reacted together with the epoxy-containing compounds and hydroxy-terminated polyurethane first adduct to form the second adduct. As shown in portion E of FIG. 2, the second adduct (shown as portion F of FIG. 2) may be formed from the first adduct and a phenolic compound and a epoxy-containing compound. Specifically, in FIG. 2 a glycidyl ether of bisphenol A is used as an epoxy-containing compound and bisphenol A is used as a phenolic compound.

While effectively any di- or poly-phenolic compound may be used herein, it is desirable for the phenolic compound to be a bisphenol compound, such as A, F or S.

The phenolic compounds are reacted with a portion of the epoxy-containing compounds and then into the first adduct to form the second adduct.

The toughener component, when used, should be present in an amount in the range of about 1 to about 90 percent by weight, such as about 10 to about 70 percent by weight, desirably about 15 to about 30 percent by weight, based on the total weight of the composition. In this amount, the toughening component may improve the performance of the inventive compositions under dynamic load.

Epoxy Resins

The epoxy resin may be selected from any of the epoxy-containing compounds described above in connection with forming the adduct.

A portion of the epoxy-containing compound that is not reacted with the phenolic compound may be used as a carrier for the formed second adduct.

The inventive compositions may also contain curing agents, which are known to those skilled in the art.

For instance, the curing agent may be a heat-activated one, such that it remains inert towards epoxy resins below a certain "threshold" temperature, which is usually at least about 80° C., and preferably at least about 100° C. or above, but reacts rapidly to effect curing once that threshold temperature has been exceeded.

Examples of curing agents generally include aliphatic, cycloaliphatic, aromatic and heterocyclic amines, such as bis-(4-aminophenyl)-methane, aniline/formaldehyde resins, bis-(4-aminophenyl) sulfone, propane-1,3-diamine, hexamethylenediamine, diethylenetriamine, triethylenetetramine, 2,2,4-trimethylhexane-1,6-diamine, m-xylylenediamine, bis-(4-aminocyclohexyl)methane, 2,2-bis-(4-aminocyclohexyl)-propane and 3-aminomethyl-3,5,5-trimethylcyclohexylamine (isophoronediamine); polyaminoamides, for example those formed from aliphatic polyamines and dimerized or trimerized fatty acids; polyphenols, such as resorcinol, hydroquinone, 2,2-bis-(4-hydroxyphyenyl)-propane (bisphenol A) and phenol/aldehyde resins; polythiols; polycarboxylic acids and anhydrides thereof, for example phthalic anhydride, tetrahydrophthalic anhydride, hexahydrophthalic anhydride, hexachloroendomethylenetetrahydrophthalic anhydride, pyromellitic dianhydride, benzophenone-3,3',4, 4'-tetracarboxylic dianhydride, the acids of the abovementioned anhydrides and also isophthalic acid and terephthalic acid.

The curing agent may have a catalytic action, examples of those having such action include tertiary amines, for example 2,4,6-tris-(dimethylaminoethyl)-phenol; imidizaoles or Mannich bases; alkali metal alcoholates, for example the Na alcoholate of 2,4-dihydroxy-3-hydroxymethylpentane; tin salts of alkanoic acids, for example tin octanoate; Friedel-Craft catalysts, such as boron trifluoride and boron trichloride and complexes and chelates thereof which are obtained by reacting boron trifluoride with, for example, 1,3-diketones; and amidines, preferably dicyandiamide.

Other examples include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

When used, the curing agent, is present in an amount sufficient to cure the composition, such as about 3 to about 15 parts per hundred parts of curable composition, for instance about 5 to about 10 parts per hundred parts of curable composition.

p-Chlorophenyl-N,N-dimethylurea (MONURON), 3-phenyl-1,1-dimethylurea (PHENURON), 3,4-dichlorophenyl-N,N-dimethylurea (DIURON), N-(3-chloro-4-methylphenyl)-N',N'-dimethylurea (CHLORTOLURON), tert-acryl- or alkylene amines like benzyldimethylamine, 2,4,6-tris(dimethylaminoethyl)phenol, piperidine or derivatives thereof, imidazole derivates, in general $C_{1-12}$ alkylene imidazole or N-arylimidazoles, such as 2-ethyl-2-methylimidazol, 6-caprolactam, a preferred catalyst is 2,4,6-tris(dimethylaminoethyl)phe-nol integrated into a poly(p-vinylphenol) matrix (as described in European Patent No. EP 0 197 892).

If desired, reactive diluents, for example styrene oxide, butyl glycidyl ether, 2,2,4-trimethylpentyl glycidyl ether, phenyl glycidyl ether, cresyl glycidyl ether or glycidyl esters of synthetic, highly branched, mainly tertiary, aliphatic monocarboxylic acids, may be added to the curable compositions to reduce their viscosity.

Other additives which the inventive compositions can include plasticizers, extenders, microspheres, fillers and reinforcing agents, for example coal tar, bitumen, textile fibres, glass fibres, asbestos fibres, boron fibres, carbon fibres, mineral silicates, mica, powdered quartz, hydrated aluminum oxide, bentonite, wollastonite, kaolin, silica, aerogel or metal powders, for example aluminum powder or iron powder, and also pigments and dyes, such as carbon black, oxide colors and titanium dioxide, fire-retarding agents, thixotropic agents, flow control agents, such as silicones, waxes and stearates, which can, in part, also be used as mold release agents, adhesion promoters, antioxidants and light stabilizers, the particle size and distribution of many of which may be controlled to vary the physical properties and performance of the inventive compositions.

When used, fillers are used in an amount sufficient to provide the desired rheological properties. Fillers may be used in an amount up to about 50 percent by weight, such as about 5 to about 32 percent by weight, for instance about 10 to about 25 percent by weight.

The fillers may be inorganic ones, such as silicas. For instance, the silica filler may be a silica-nanoparticle. The silica nanoparticle can be pre-dispersed in epoxy resins, and may be selected from those commercially available under the tradename NANOPOX, such as NANOPOX XP 0314, XP 0516, XP 0525, and XP F360 from Hanse Chemie, Germany. These NANOPOX products are silica nanoparticle dispersions in epoxy resins, at a level of up to about 50% by weight. These NANOPOX products are believed to have a particle size of about 5 nm to about 80 nm. NANOPOX XP 0314 is reported by the manufacture to contain 40 weight percent of silica particles having a particle size of less than 50 nm diameter in a cycloaliphatic epoxy resin.

Thermoplastic Layer

The thermoplastic layer is selected from a host of materials, including polyether sulfones, polysulfones, polyether ketones, polyamides, polyamide imides, polysiloxanes, polyether imides, polyethylene, polypropylene, polybutylene, copolymers thereof and combinations thereof, certain of the physical properties of some of which are listed below in Table A. A particularly desirable thermoplastic materials useful as the layer is polyether sulfone, such as is available commercially from Sumitomo. The thermoplastic layer dissolves in the matrix resin during the tailored processing steps and then phase separates during the cure step.

TABLE A

| Thermoplastic Material | Tg, °C. | Yield Strength, MPa | Flexural Strength, MPa | Flexural Modulus, MPa |
|---|---|---|---|---|
| Polyether imide | 213 | 105 | 83 | 1920 |
| Polyether sulfone | 224 | 84 | 130 | 2600 |
| Polyether ether ketone | 143 | 100 | — | 3800 |
| Polyamide | 167 | — | 145 | 3300 |

In general, the curing temperatures of the compositions are between 80 and 250° C., such as between 100 and 180° C., for a period of time of about 30 minutes to 4 hours. Thus, the compositions can be used at relatively moderate temperatures to achieve very good productivity. The curing can if desired be conducted in two stages, for example, by interrupting the curing process or, if a curing agent is employed for elevated temperatures, by allowing the curable composition to cure partially at lower temperatures. The products obtained thereby are called B-stage resins and are suitable, for example, for prepregging or towpregging applications, discussed in more detail below.

The fiber used to form the prepreg from which the prepreg laminate is prepared layer may be constructed from unidirectional fibres, woven fibers, chopped fibers, non-woven fibres or long, discontinuous fibres.

The fiber chosen may be selected from carbon, glass, aramid, boron, polyalkylene polybenzimidazole, polyetheretherketone, polyphenylene sulfide, poly p-phenylene benzobisoaxazole, silicon carbide, phenolformaldehyde, phthalate, polyethylene and naphthenoate.

The carbon is selected from polyacrylonitrile, pitch and acrylic, and the glass is selected from S glass, S2 glass, E glass, R glass, A glass, AR glass, C glass, D glass, ECR glass, glass filament, staple glass, T glass and zirconium oxide glass.

The invention relates to processes for producing a prepreg laminate. One such process includes the steps of providing a first prepreg; providing a second prepreg, wherein at least one of the first prepreg or the second prepreg is prepared from a matrix resin comprises a toughened benzoxazine-containing composition; and providing a thermoplastic interlayer; joining the first prepreg and the second prepreg with the thermoplastic interlayer therebetween to form a prepreg laminate assembly; and exposing the resulting prepreg laminate assembly to elevated temperature and pressure conditions sufficient to form a prepreg laminate.

Towpreg laminates may also be prepared in accordance with the present invention.

The inventive prepreg laminates are particularly useful in the manufacture and assembly of composite parts for aerospace and industrial end uses, bonding of composite and metal parts, core and core-fill for sandwich structures and composite surfacing.

EXAMPLES

Example 1

Synthesis of Adducts

First Adduct

The first adduct was formed as follows:

Set up a reactor with a positive dry nitrogen gas supply, heating and cooling capability, stirring capability and temperatures monitoring capability.

Add 50.00 parts of DER 332 epoxy rein to the reactor.

Add 42.86 parts TERATHANE 2000 polyether glycol to the reactor.

Heat the contents of the reactor to a temperature of 225° F. under a reduced pressure of greater than 28 inches of Hg vacuum, with mixing for a period of time of 60 minutes.

Turn off the vacuum source to the reactor and bleed dry nitrogen into the headspace of the reactor.

Cool the contents of the reactor to a temperature of 170° F.

While mixing, carefully add 0.0005 parts of 95% dibutyltin dilaurate catalyst.

Add 6.57 parts of MONDUR M (4,4' methylene diisocyanate).

Adjust the reactor mixing and temperature set points to maintain a temperature of 180° F. and maintain positive dry nitrogen flow.

Monitor the molecular weight increase of the first adduct which is forming using GPC.

When the molecular weight reaches 62,000, add 0.57 parts of p-aminophenol and continue mixing at a temperature of 180° F. with positive dry nitrogen flow.

Monitor the isocyanate content of the reactor mixture using IR until all isocyanate has been reacted.

Transfer the mixture of hydroxyl-terminated polyurethane prepolymer first adduct in epoxy resin to storage containers.

Second Adduct

The second adduct was formed as follows:

Set up a reactor with a heating and cooling capability, stirring capability and temperature monitoring capability.

Add 29.61 parts of EPON 826/BLENDEX 338 mixture (22.78 parts EPON 826 and 6.83 parts of BLENDEX 338), 1.82 parts of EPON 828 and 8.89 parts of the first adduct into the reactor and mix at a temperature of 180° F.

Add 15.22 parts of bisphenol A, heat the contents of the reactor to a temperature of 230° F., mix until homogeneous and then cool to a temperature of 170° F.

Add 0.015 parts of triphenylphosphine ethyl iodide and heat the contents of the reactor to a temperature of 275° F. with mixing until the viscosity at a temperature of 250° F. shows a viscosity greater than 4,000 poise.

Add 27.78 parts of EPON 826/BLENDEX 338 mixture (21.37 parts EPON 826 and 6.41 parts of BLENDEX 338) and mix under a reduced pressure of greater than 25 inches Hg vacuum.

Add 10 parts EPON 828 and 6.67 parts of the first adduct and mix under a reduced pressure of greater than 25 inches of Hg vacuum.

Transfer the mixture of first and second adducts in epoxy resin to storage containers.

Example 2

Composition Formulation

Compositions were formulated from the noted components in the amounts recited in Table 1 below.

TABLE 1

| Component | | Sample No./ Amt. (Wt. %) | |
|---|---|---|---|
| Type | Identity | 1 | 2 |
| Benzoxazine | XV | 80 | 80 |
| Toughener | First Adduct/ Second Adduct | 9.44 | — |
| | Malhaupt Adduct* | — | 9.44 |

*Prepared in accordance with U.S. Pat. No. 5,278,257 (Malhaupt)

The constituents of the samples were added as follows:

The benzoxazine was degassed and warmed at a temperature of 220° F. for a period of time of about 15 to 20 minutes to render it flowable, without initiating curing.

For Sample No. 1 the toughener composed of the first adduct and second adduct was mixed with the benzoxazine until a homogeneous mixture was formed.

For Sample No. 2 the Malhaupt Adduct was mixed with the benzoxazine until a homogeneous and clear mixture was observed.

Each of Sample Nos. 1 and 2 were dispersed into a warm prepared mold. Once the samples had cooled within their respective molds, the Malhaupt Adduct from Sample No. 2 was observed visually to separate and collect on the surface of the sample, forming opalescent swirls within the body of the casing. No such observation was made with Sample No. 1.

The samples were each cured in an autoclave at 90 psi pressure, by ramping to a temperature of 350° F. at 5° F./min and holding for 3 hours at that temperature, followed by a cooling down period of 60 minutes at 90° F. Upon completing these cure profile, each of the samples was considered to be "formed" into a panel within the respective mold.

After cure, the upper/outer portion of the panel formed from Sample No. 2 was observed to be tacky (uncured) and there was separation at the bottom of the panel.

Typically, panels are evaluated by one or more of the following procedures: 1. Dynamic mechanical thermal analysis ("DMTA"); Tg—Dry and Wet, 2. % water absorption, 3. tensile strength and modulus, 4. % elongation and 5. % volatile.

DMTA was performed on cured samples using a double cantilever fixture. The cured samples were isothermally equilibrated at a temperature of 40° C. in an oven and the temperature was increased at a 5° C./min ramp rate to a temperature of 250° C. Tg values were obtained from this DMTA evaluation from onset G', storage shear modulus.

The cured samples were also subjected to boiling water for 3 days, and weight gain was recorded. Tg values were obtained from these samples using a DMTA evaluation.

Tensile strength, elongation and modulus were determined in accordance with ASTM D 790, using cured samples with the following specimen dimensions: 0.125×0.5 ×4 in., span 2 in., test speed: 0.05 in./min.

Here, the % volatiles were determined to be 0.41%. The percent volatiles were determined by weight loss from a 2 to 3 gram sample in an aluminum dish conditioned for a period of time of 30 minutes at a temperature of 130° C. in a forced air oven.

The panels were unacceptable for testing using the remaining four procedures.

Unlike the panel formed from Sample No. 2, the panel formed from Sample No. 1 was observed to be a hard, dry, cross-linked material with no evidence of toughener separation from the benzoxazine matrix. The performance of the panel made from Sample No. 1 is set forth below in Table 2:

TABLE 2

| | |
|---|---|
| Tg, DMTA dry, E'onset, ° C. | 194 |
| Tg, DMTA wet, E'onset, ° C. | 165 |
| Moisture uptake, % After 3 days boiling water | 1.32 |
| Tensile strength, 23° C., MPa | 68.6 |
| Tensile modulus, 23° C., GPa | 3.9 |
| Elongation to failure, % | 2.1 |

The prepreg laminates may be better understood with reference to FIG. 1. In FIG. 1 a quasi-isotropic prepreg laminate in an exploded view is shown. Prepregs are shown as every other layer in FIG. 1 with an arrow pointing thereto on the righthand side of the figure. Thermoplastic layers appear between each prepreg layer in FIG. 1 with an arrow pointing thereto on the lefthand side of the figure. The prepreg layers are oriented by reference to the number of degrees off center, as indicated on the righthand side of the figure.

A matrix resin based on 75% benzoxazine and 25% epoxy resin was used to form the prepregs from which the prepreg laminates are to be prepared. RADEL 704 (a polyether sulfone) was used as thermoplastic film between prepregs formed the matrix resin and carbon fiber. The assembled prepreg laminates based on this construction with reference to FIG. 1 were cured in an autoclave at 90 psi pressure, by ramping at 5° F./min to a temperature of 230° F. and holding for 30 minutes and then ramping to 350° F. and holding at that temperature for 2 hours to allow for cure to occur. Once cured, the prepreg laminate was cooled down to 90° F. for 60 minutes. Upon completing this cure profile, the prepreg laminate was considered to be "formed" into a panel within the mold.

The cured prepreg laminates made in this way as shown in FIG. 1 were evaluated and exhibited a CAI of 225.5 Mpa. In contrast, a prepreg laminate made without the thermoplastic film exhibited a CAI of 187.8 Mpa. Thus, a twenty percent increase in CAI was observed with the prepreg laminate made with the thermoplastic interlayer in accordance with the present invention.

What is claimed is:

1. A prepreg laminate comprising:
   (a) a first prepreg;
   (b) a second prepreg; and
   (c) a thermoplastic layer therebetween, wherein at least one of the first prepreg or the second prepreg is made from a matrix resin comprising a benzoxazine-containing composition.

2. The prepreg laminate of claim 1, wherein the second prepreg is constructed from a material different from the first prepreg.

3. The prepreg laminate of claim 1, wherein the first prepreg is fiber-reinforced with a fiber selected from the group consisting of carbon, glass, aramid, boron, polyalkylene, polybenzimidazole, polyetheretherketone, polyphenylene sulfide, poly p-phenylene benzobisoaxazole, silicon carbide, phenolformaldehyde, phthalate, polyethylene and naphthenoate.

4. The prepreg laminate of claim 1, wherein the second prepreg is fiber-reinforced with a fiber selected from the group consisting of carbon, glass, aramid, boron, polyalkylene polybenzimidazole, polyetheretherketone, polyphenylene sulfide, poly p-phenylene benzobisoaxazole, silicon carbide, phenolformaldehyde, phthalate, polyethylene, polypropylene, polybutylene and naphthenoate.

5. The prepreg laminate of claim 3, wherein the glass is a member selected from the group consisting of S glass, S2 glass, E glass, R glass, A glass, AR glass, C glass, D glass, ECR glass, glass filament, staple glass, T glass and zirconium oxide glass.

6. The prepreg laminate of claim 4, wherein the glass is a member selected from the group consisting of S glass, S2 glass, E glass, R glass, A glass, AR glass, C glass, D glass, ECR glass, glass filament, staple glass, T glass and zirconium oxide glass.

7. The prepreg laminate of claim 3, wherein the carbon is a member selected from the group consisting of polyacrylonitrile, pitch and acrylics.

8. The prepreg laminate of claim 4, wherein the carbon is a member selected from the group consisting of polyacrylonitrile, pitch and acrylics.

9. The prepreg laminate of claim 1, wherein the matrix resin further comprises an epoxy component or an episulfide component.

10. The prepreg laminate of claim 1, wherein the benzoxazine-containing composition comprises one or more tougheners selected from the group consisting of a first adduct prepared from hydroxy-containing compounds, isocyanate-containing compounds, and a first phenolic compound; an adduct prepared from the first adduct, epoxy-containing compounds and a second phenolic compound; 1,3-butadiene/acrylonitrile; 1,3-butadiene/(meth)acrylic acid esters; 1,3-butadiene/methacrylic acid esters; a 1,3-butadiene/acrylonitrile/styrene graft copolymer; a 1,3-butadiene/methyl methacrylate/styrene graft copolymer; a 1,3-butadiene/acrylonitrile copolymer; core shell polymers; polyether sulfone; polyamide imides; polysulfones; polyether ketones; acrylonitrile-butadiene co-polymer having secondary amine terminal groups; acrylonitrile-butadiene co-polymer having carboxyl terminal groups; poly(propylene) oxide; amine-terminated polyethylene, polypropylene, polybutylene sulfide; polyetherimide; polysiloxanes; poly amides; polyphenylene oxide and combinations thereof.

11. The prepreg laminate of claim 1, wherein the benzoxazine component comprises one or more of wherein o is 1-4, X is selected from the group consisting of the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from the group consisting of hydrogen, alkyl, and aryl, and $R_4$ is selected from hydrogen, halogen, alkyl, and alkylene, or wherein p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from the group consisting of hydrogen, halogen, alkyl and alkenyl.

12. The prepreg laminate of claim 1, wherein the benzoxazine component comprises one or more of wherein X is selected from the group consisting of a direct bond, $CH_2$, $C(CH_3)_2$, $C=O$, S, $S=O$ and $O=S=O$, and $R_1$, $R_2$, and $R_3$ are the same or different and alkyl, and $R_4$ is selected from the group consisting of a hydrogen, alkyl, alkenyl and aryl.

13. The prepreg laminate of claim 1, wherein the benzoxazine component comprises one or more of

14. The prepreg laminate of claim 1, wherein the thermoplastic layer is selected from the group consisting of polyether sulfones, polysulfones, polyether ketones, polyamides, polyamide imides, polysiloxanes, polyether imides, polyethylene, polypropylene, polybutylene, copolymers thereof and combinations thereof.

15. The prepreg laminate of claim 9, wherein the epoxy resin component is a member selected from the group consisting of $C_1$-$C_{28}$ alkyl-, poly-phenol glycidyl ethers; polyglycidyl ethers of pyrocatechol, resorcinol, hydroquinone, 4,4'-dihydroxydiphenyl methane, 4,4'-dihydroxy-3,3'-dimethyldiphenyl methane, 4,4'-dihydroxydiphenyl dimethyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris (4-hydroxyphyenyl)methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; glycidyl ethers of para-amino phenol, 4,4'-dihydroxy-3,3'-diethyl methane, 4,4'-dihydroxy-3,3'-diisopropyl methane, tris-(4-hydroxyphenyl) ethane, tris-(4-hydroxyphenyl) propane, 4,4'-dihydroxydiphenyl dicyclopentadiene and combinations thereof.

16. The prepreg laminate of claim 1, further comprising an inorganic filler component.

17. The prepreg laminate of claim 16, wherein the inorganic filler component is a silica having a particle size in the nanoscale range.

18. Cured reaction products of the prepreg laminate according to claim 1.

19. A process for producing a prepreg laminate, steps of which comprise:
   A) providing a first prepreg;
   B) providing a second prepreg, wherein at least one of the first prepreg or the second prepreg is prepared from a matrix resin comprises a toughened benzoxazine-containing composition; and
   C) providing a thermoplastic interlayer; and
   D) joining the first prepreg and the second prepreg with the thermoplastic interlayer therebetween to form a prepreg laminate assembly; and
   E) exposing the resulting prepreg laminate assembly to elevated temperature and pressure conditions sufficient to form a prepreg laminate.

20. A prepreg laminate made by the process according to claim 19.

* * * * *